June 14, 1932.  W. H. T. HOLDEN  1,862,595
VOLTAGE REGULATOR
Filed March 17, 1930
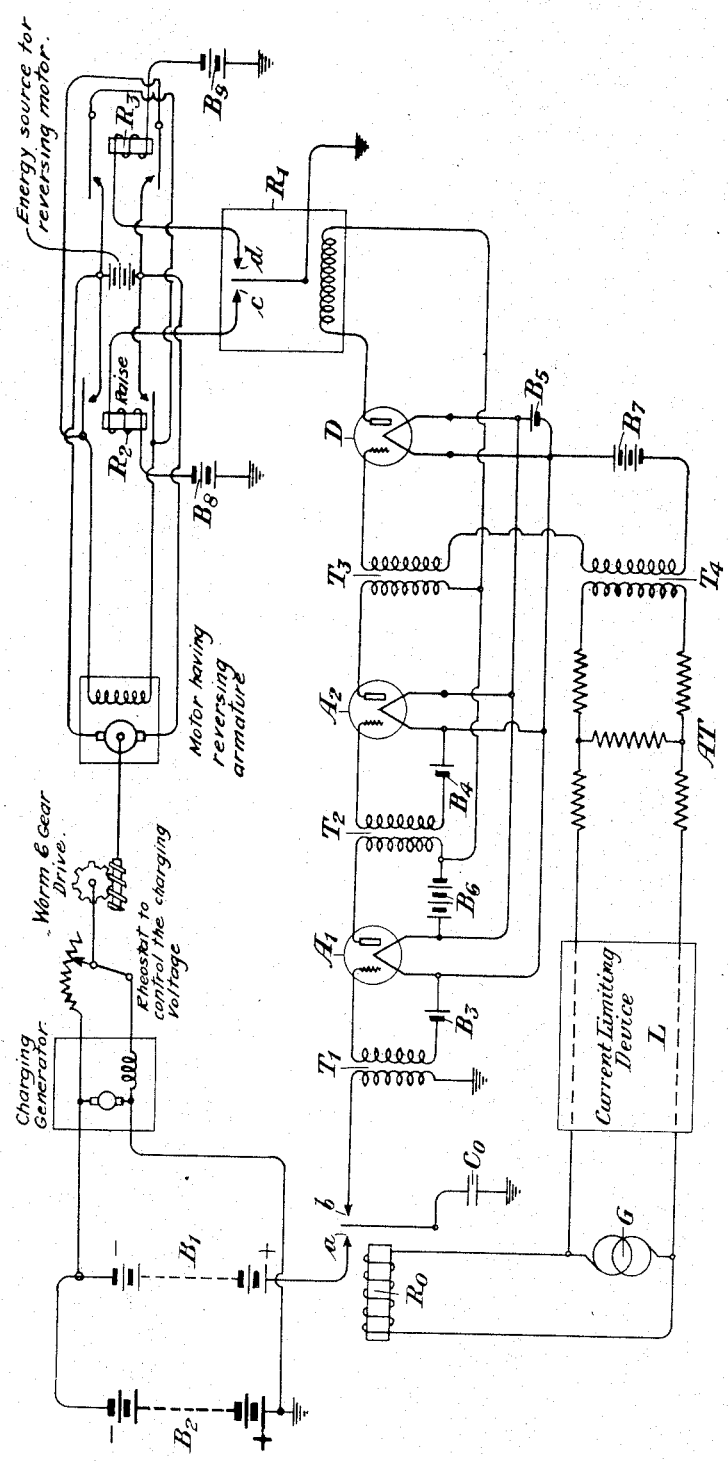
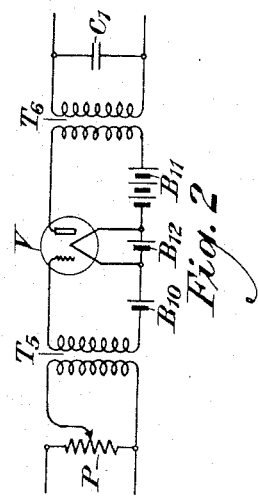
INVENTOR
W.H.T.Holden
BY
ATTORNEY Patented June 14, 1932

1,862,595

UNITED STATES PATENT OFFICE

WILLIAM H. T. HOLDEN, OF BROOKLYN, NEW YORK, ASSIGNOR TO AMERICAN TELEPHONE AND TELEGRAPH COMPANY, A CORPORATION OF NEW YORK

VOLTAGE REGULATOR

Application filed March 17, 1930. Serial No. 436,546.

This invention relates to regulating devices and circuits, and more particularly to devices and circuits to regulate the voltage of storage batteries.

This invention may find application in systems employing storage batteries where it is desirable and often necessary that these batteries be maintained automatically in a properly charged condition. Such a system may be found, for example, in many telephone exchanges where it may be inexpedient or too expensive to keep someone in constant attendance to look after the charging of the various batteries.

While this invention will be pointed out with particularity in the appended claims, the invention itself both as to its objects and features will be better understood from the detailed description hereinafter following, when read in connection with the accompanying drawing showing one embodiment of the invention merely for the purpose of illustration, in which:

Fig. 1 is a complete wiring diagram of this embodiment of the invention.

Fig. 2 shows a specific form of current limiting device that may be used in Fig. 1.

Referring to the drawing, the reference character $B_1$ will designate a battery of highly constant voltage which carries only a very small and constant load. The reference character $B_2$ designates another battery of the lead acid type which requires regulation and which normally has a terminal voltage substantially equal to that of the battery $B_1$. The negative terminals of these batteries are strapped together. The positive terminal of the battery $B_2$ is connected to ground while the positive terminal of the battery $B_1$ is connected to a contact $a$ which forms part of a polar relay, the details and operation of which will be subsequently described.

This polar relay just referred to is designated $R_0$ and includes an electromagnetic winding placed adjacent to an armature which may freely vibrate between contacts $a$ and $b$. The armature of this relay is connected to ground through a condenser $C_0$. The winding of the relay is connected to a generator G which may be of any well known type and which produces current of some definite and predetermined frequency. The armature of this relay will move back and forth between contacts $a$ and $b$ at the frequency of the current of generator G. The contact $b$ of the relay $R_0$ is connected to ground through the primary winding of a transformer $T_1$. The secondary winding of this transformer is connected to an amplifying system including two electron tubes designated $A_1$ and $A_2$, both of which are of the three-electrode type. These amplifying tubes are coupled by a transformer $T_2$. The second amplifying tube $A_2$ is coupled by means of a transformer $T_3$ to another electron tube of the three-electrode type designated D which is employed herein for the purpose of detection.

It is to be noted that the grid electrodes of the tubes $A_1$ and $A_2$ are connected to their corresponding filament electrodes through the secondary windings of transformers $T_1$ and $T_2$ and batteries $B_3$ and $B_4$, respectively. The filament electrodes of tubes $A_1$, $A_2$ and D, are connected in parallel relationship with respect to a battery $B_5$. A battery $B_6$ is connected between the filament electrodes of these tubes and their plate electrodes through parallel paths which include the primary winding of transformer $T_2$, the primary winding of transformer $T_3$, and the winding of a relay $R_1$, respectively. The details of the latter relay and its operation will be further described hereinafter.

The grid electrode of the tube D is connected to its filament electrode through the secondary winding of transformer $T_3$, the secondary winding of a transformer $T_4$, and a battery $B_7$, all of which are connected in series relationship. It seems hardly necessary to state that the batteries $B_3$ and $B_4$ maintain the grid electrodes of the associated amplifying tubes at negative potentials suitable for good amplifying action, and that the battery $B_7$ so biases the grid electrode of the tube D that alternating potentials impressed upon transformers $T_3$ and $T_4$ will produce corresponding space currents between the plate and filament electrodes of this tube.

The primary winding of the transformer $T_4$ is connected to the generator G through an attenuator AT which includes series and shunt resistive elements. The circuit interconnecting generator G with the primary winding of transformer $T_4$ may also, if desired, include a current limiting device L which may take the form shown in Fig. 2 of the drawing, and this circuit may also include, if deemed desirable, a phase adjusting arrangement or apparatus which may be of any type well known in the art.

The relay $R_1$ may be any form of contact-making milliammeter relay well known in the art. This relay includes a winding and an armature which may be moved between two contacts $c$ and $d$. This relay is of a marginal type and its armature will be practically in its mid-position free from contacts $c$ and $d$ when the amplitude of the current flowing through its winding lies between two definite and predetermined limits. When the amplitude of the current flowing through the winding of the relay $R_1$ becomes smaller than the lower limit, one of the contacts of this relay, i. e. the one designated $c$, will be closed by the armature, and when this current exceeds the upper limit the other contact, i. e. contact $d$, will be closed. The contact $c$ is connected to ground through the winding of a relay $R_2$ and a battery $B_8$. The contact $d$ is connected to ground through the winding of a relay $R_3$ and a battery $B_9$. The armature of this relay may be connected to ground.

It will be seen that the armature of the polar relay $R_0$ will alternately connect the condenser $C_0$ between the positive terminal of battery $B_1$ and the upper terminal of the primary winding of the transformer $T_1$. When this armature closes contact $a$, the condenser $C_0$ will be connected in series with batteries $B_1$ and $B_2$ which will produce mutually opposite potentials. When contact $b$ is closed by the armature of relay $R_0$, the condenser $C_0$ will be connected in series with the primary winding of the transformer $T_1$. The condenser $C_0$ and the primary winding of transformer $T_1$ will form a tuned circuit which may be designed to be in resonance at any desired frequency. It is one of the features of this invention that this tuned circuit have a frequency of resonance equal to the frequency of the current supplied by generator G to the winding of relay $R_0$. The generator G should supply current of a frequency which is low enough to permit the armature of the relay $R_0$ to properly follow the current, and yet, high enough so as to be properly amplified by an electronic amplifier of the type shown. A suitable frequency for the generator G and for the tuned circuit formed by condenser $C_0$ and the primary winding of the transformer $T_1$, may, if desired, be 135 cycles per second.

When the voltages of batteries $B_1$ and $B_2$ are equal, the upper and lower plates of the condenser $C_0$ will be at the same potential which will be ground in this case. Inasmuch as the condenser $C_0$ will be without a charge, there will be no potential impressed upon the primary winding of transformer $T_1$ when the armature of relay $R_0$ closes contact $b$. In that case, no current will be amplified by tubes $A_1$ and $A_2$.

When the voltage of battery $B_1$ exceeds the voltage of battery $B_2$, the voltage impressed upon the upper plate of the condenser $C_0$ will be positive with respect to the voltage impressed upon the lower plate of this condenser upon the closure of the contact $a$. Upon the closure of contact $b$, condenser $C_0$ will be discharged through the primary winding of transformer $T_1$, producing a current therein in one direction. While the battery $B_1$ remains higher in voltage than battery $B_2$, each closure of contact $d$ will cause the upper plate of condenser $C_0$ to be briefly charged, and then correspondingly discharged upon the closure of the contact $b$. Under these circumstances, pulses of current will be produced in the primary winding of transformer $T_1$ the frequency of which will correspond to the resonant period of the tuned circuit. Amplifiers $A_1$ and $A_2$ will amplify the resultant alternating current and this current will become impressed upon the grid electrode of the tube D by transformer $T_3$. A corresponding direct current will tend to flow through the winding of the relay $R_1$.

When the voltage of the battery $B_2$ exceeds that of battery $B_1$, the upper plate of the condenser $C_0$ will be periodically charged negatively with respect to its lower plate, and pulses of current will flow through the primary winding of transformer $T_1$ in the opposite direction, and these pulses will occur at the same frequency as that of resonance of the tuned circuit. Tubes $A_1$ and $A_2$ will amplify an alternating current voltage of the same frequency which will be similarly impressed upon the grid electrode of the tube D. This will cause current to flow unidirectionally through the winding of relay $R_1$, the amplitude of which will correspond to the voltage impressed upon the condenser $C_0$.

It is to be noted that as the battery $B_2$ changes from a voltage which is higher than that of the battery $B_1$, to one which is lower than the voltage of the latter battery, the phase of the current impressed upon the amplifying system by the transformer $T_1$ will be shifted through 180 degrees. The primary winding of the transformer $T_4$ will be supplied by generator G with alternating current of the same frequency as that flowing through the primary winding of transformer $T_3$. The circuit connected to the generator G should be so poled that when the voltage of the battery $B_2$ exceeds that of the battery $B_1$, the alternating currents flowing through the primary windings of the transformers $T_3$ and $T_4$ will be in phase with each other, thereby becoming additive in their effects upon the grid electrode of the tube D. Since these currents are in phase, the current flowing through the winding of the relay $R_1$ will be substantially increased. On the other hand, if the voltage of the battery $B_2$ is lower than that of the battery $B_1$, the alternating currents impressed upon the grid electrode of the tube D by the transformers $T_3$ and $T_4$ will be 180 degrees displaced with respect to each other, and their effects upon the grid electrode of the tube D will be subtractive. Consequently, the current flowing through the winding of the relay $R_1$ will be substantially reduced.

The armature of the relay $R_1$ will be practically in its mid-position free from either of the contacts $c$ or $d$ when the generator G supplies the only potential impressed upon the grid electrode of the tube D. The current through the winding of relay $R_1$ will be increased above some predetermined value when the voltage of battery $B_2$ exceeds that of battery $B_1$, whereupon the armature of relay $R_1$ will close contact $d$. The current through the winding of relay $R_1$ will be reduced below another predetermined value when the voltage of the battery $B_2$ is smaller than that of the battery $B_1$, whereupon the armature of relay $R_1$ will close the contact $c$. The closure of either of the contacts $c$ or $d$ will operate either of the relays $R_2$ or $R_3$ respectively.

Relays $R_2$ and $R_3$ may be coupled to the battery $B_2$ by any automatic charging system well known in the art. The relay $R_2$ may be employed to increase the charging rate, and relay $R_3$ to reduce that rate. One form of such a system may include a rheostat connected to the field winding of a charging generator, including means to impart to the rheostat a number of separate successive movements so as to vary the resistance interposed in series with the field winding in order to maintain the battery at a substantially constant voltage. In such a system it will be found necessary to incorporate an interrupting device between the armature of relay $R_1$ and ground in order to maintain the circuit extending to either of the relays $R_2$ or $R_3$ open for about 25 seconds out of each 30, whereby "hunting" of the generator resulting from delay in the response of the storage battery, or batteries, to a change in the charging rate, may be avoided.

The battery $B_1$ represents one of the essential elements of this invention, and it is necessary that it be maintained highly constant in voltage. This battery, if desired, may consist of a plurality of dry cells renewed frequently, or of one or more storage batteries which discharge at a very low rate so as to furnish a voltage which is practically constant over a considerable period of time. Clock operated switching mechanism of any well known type may be included to periodically substitute new or fully charged batteries for those which are partly discharged.

One form of current limiting device is shown in Fig. 2 of the drawing, and this device may be interposed in the circuit extending between the generator G and the transformer $T_4$, as stated hereinabove. This device may include an electron tube V of the three-electrode type, the grid electrode of which is connected to the filament electrode through the secondary winding of a transformer $T_5$ and a battery $B_{10}$. The plate electrode may be connected to the filament electrode through the primary winding of a transformer $T_6$ and a battery $B_{11}$. A battery $B_{12}$ may be connected to the filament electrode of this tube. The primary winding of the transformer $T_5$ may be connected to a potentiometer P. The secondary winding of the transformer $T_6$ may be bridged by a condenser $C_1$ so as to provide a parallel tuned circuit which is anti-resonant at the frequency of the current supplied to the arrangement by the generator G shown in Fig. 1. It will be apparent that this tuned circuit will substantially suppress the effects of all harmonic currents transmitted thereto.

The current limiting device shown in Fig. 2 may be employed in the arrangement shown in Fig. 1 if the amplitude of the current supplied by the generator G is quite variable. The arrangement shown in Fig. 2 represents an amplifier which is loaded to the point where increases in the current transmitted thereto will decrease the gain of the system, and vice versa, so that the current in its output, which is of the desired frequency, will be substantially constant.

It will be understood that while batteries $B_1$ and $B_2$ may have equal voltages normally, this is not a necessary condition, for a potentiometer may be bridged across the battery of higher voltage to reduce its voltage to any desired value.

While this invention has been shown in certain particular arrangements merely for the purpose of illustration, it will be understood that the general principles of this invention may be applied to other and widely varied organizations without departing from the spirit of the invention and the scope of the appended claims.

What is claimed is:

1. The combination of a battery of highly constant voltage, a battery of substantially equal voltage which is variable one pole of which is connected to the similar pole of the other battery, a condenser, means for periodically connecting said condenser in series with the remaining poles of said batteries, and means for determining the polarity of the voltage impressed upon said condenser.

2. The combination of two batteries one of which is constant in voltage and the other variable, a condenser connected in a local circuit with said batteries which are poled so as to produce mutually opposite effects, and means coupled to the condenser for producing a direct current having an amplitude which is proportional to the voltage impressed on the condenser.

3. The combination of two batteries, a condenser, a winding, means for periodically connecting said condenser between similar poles of said batteries and the terminals of said winding, and means for determining the polarity of the voltage impressed on said winding.

4. The combination of two batteries, a condenser, a transformer, and means for alternately connecting the condenser in a local circuit with said batteries so that these batteries may produce mutually opposite effects and between the terminals of the primary winding of said transformer, the condenser and the primary of said transformer forming a circuit resonant at some predetermined frequency.

5. The combination of a polar relay, a tuned circuit consisting of inductive and capacitive elements, the armature and one contact of the polar relay being connected in series in the tuned circuit, a source of alternating current connected to the winding of said relay, and a source of variable direct current voltage connected in series with the capacitive element of the tuned circuit and with the armature and another contact of said relay.

6. The method of producing a direct current having an amplitude proportional to the voltage variation of a storage battery which consists in producing an electrostatic charge proportional to the variation in the voltage of said battery, producing an alternating current having a voltage magnitude proportional to the electrostatic charge, and converting the alternating current into a direct current.

7. The method of determining the departure in the voltage of a battery from some predetermined value which consists in producing an electrostatic charge when the voltage of the storage battery is different from the predetermined value, producing an alternating voltage of definite frequency of a magnitude proportional to the electrostatic charge, producing an alternating voltage of the same frequency which is constant in magnitude, and superimposing the two alternating voltages on each other.

8. The method of determining the departure of the voltage of a storage battery from some predetermined value and the direction of the departure which consists in producing an electrostatic charge of one polarity when the voltage of the storage battery exceeds the predetermined value, deriving from the electrostatic charge an alternating current of definite frequency having an amplitude proportional to the magnitude of the electrostatic charge, producing an electrostatic charge of opposite polarity when the voltage of the storage battery is less than the predetermined value, and deriving from the latter electrostatic charge an alternating current of the same frequency displaced 180 degrees in phase with respect to the first-mentioned alternating current and having an amplitude proportional to the magnitude of the latter electrostatic charge.

9. The method of determining the departure of the voltage of a storage battery from some predetermined value as well as the direction of the departure which consists in producing an electrostatic charge of one polarity when the voltage of the storage battery exceeds the predetermined value, producing an alternating current of definite frequency having an amplitude proportional to the magnitude of the electrostatic charge, producing an alternating current of the same frequency of constant amplitude, comparing the amplitudes of said alternating currents, subsequently producing an electrostatic charge of opposite polarity when the voltage of the storage battery is less than the predetermined value, producing an alternating current of the same frequency displaced 180 degrees in phase with respect to the other currents and having an amplitude proportional to the amplitude of the latter electrostatic charge, and comparing the amplitude of the wave displaced in phase with the amplitude of the wave of constant magnitude.

10. A voltage regulating system comprising a storage battery to be regulated, another battery of constant voltage, a condenser, a polar relay the armature and one contact of which are connected in series with the condenser and with said batteries which are poled in opposition, a source of alternating current connected to the winding of said relay, a transformer the primary of which is connected in series with the armature and the other contact of said relay and with said condenser, an amplifier coupled to the secondary of the said transformer, a detector coupled to said source of alternating current and said amplifier, and a marginal relay connected to said detector.

In testimony whereof I have signed my name to this specification this 15th day of March, 1930.

WILLIAM H. T. HOLDEN.